Nov. 1, 1927. 1,647,673
E. G. STRECKFUSS
MEAT CLAMP
Filed Sept. 20, 1926 3 Sheets-Sheet 1
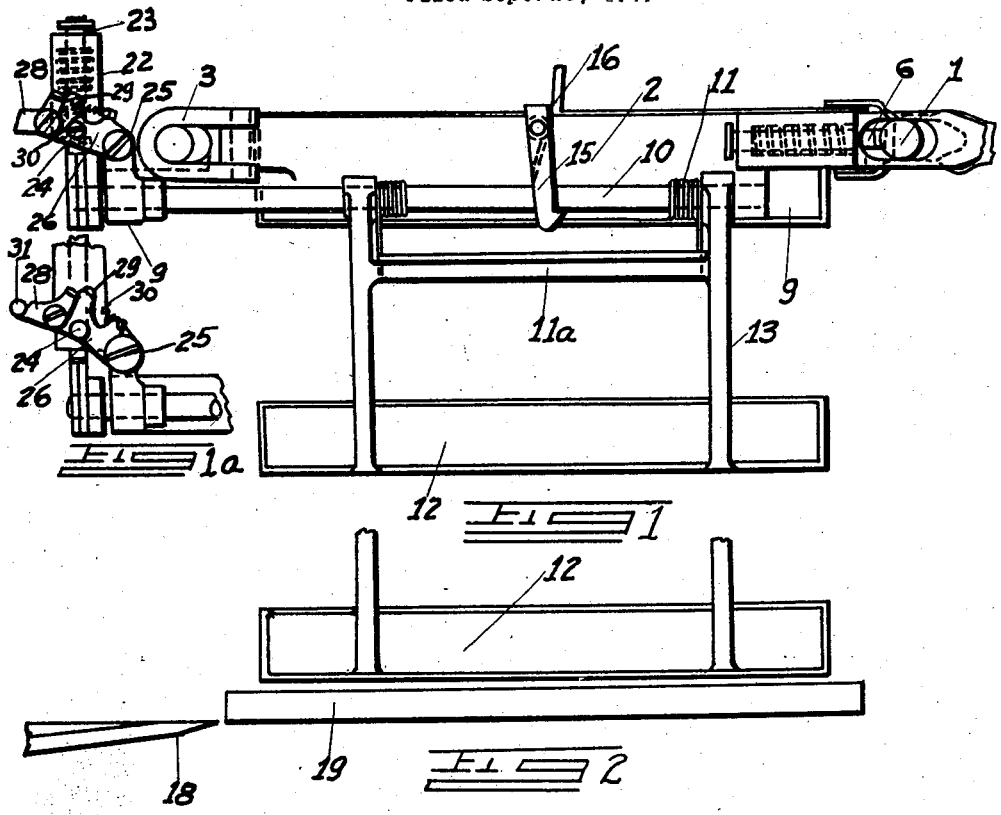
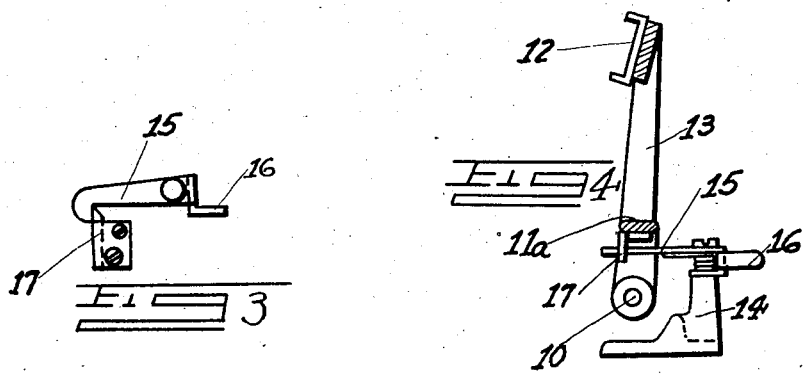
INVENTOR.
Elmer G. Streckfuss
BY
Allen T Allen
ATTORNEY.

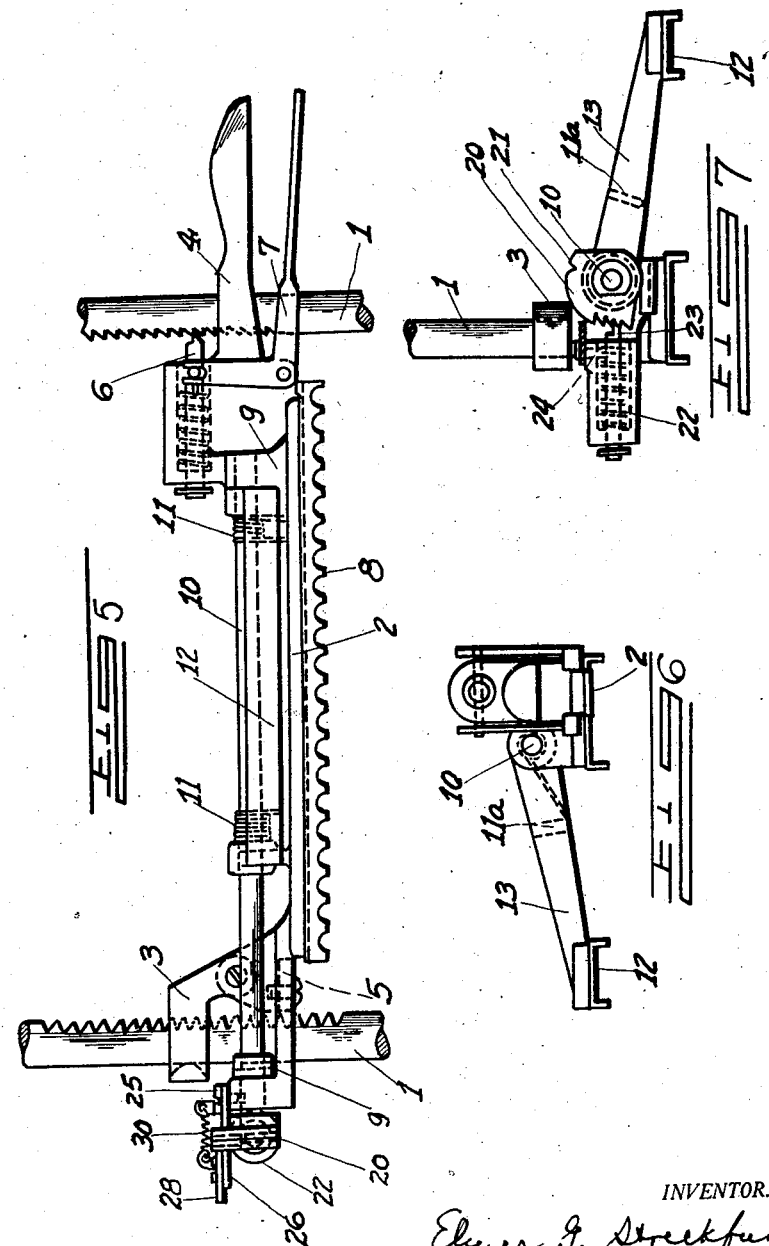

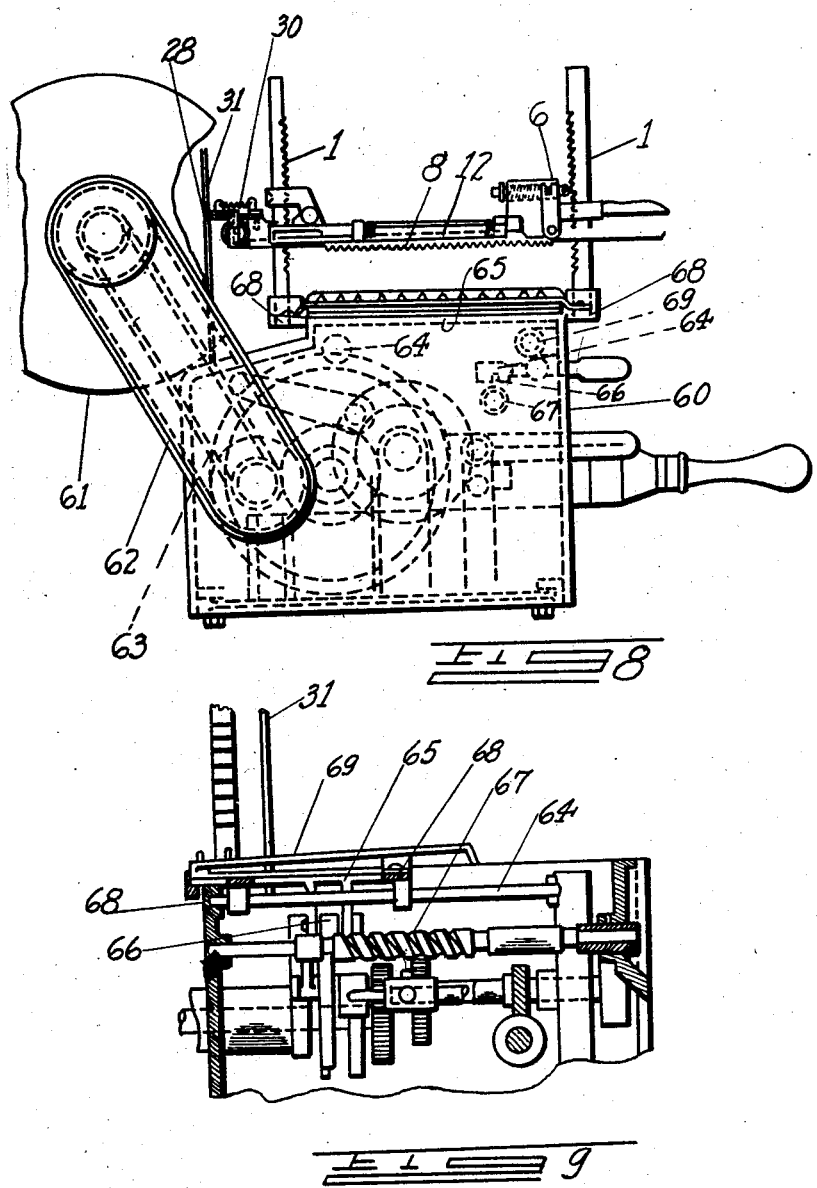

Patented Nov. 1, 1927.

1,647,673

UNITED STATES PATENT OFFICE.

ELMER G. STRECKFUSS, OF CINCINNATI, OHIO, ASSIGNOR TO THE CINCINNATI TIME RECORDER COMPANY, OF CINCINNATI, OHIO, A CORPORATION OF OHIO.

MEAT CLAMP.

Application filed September 20, 1926. Serial No. 136,686.

My invention relates to meat clamps such as are employed in meat slicers for advancing the meat to a cutting knife. Such meat clamps either move only in a series of short steps to adjust the thickness of slice to be made by a swinging knife, or else move both in the short steps and in a direction at right angles thereto, together with a table that carries the meat to and fro across a cutting blade held in on a fixed center.

My invention applies to either style of machine, and deals specifically with the problem of holding a long piece of meat in position, first by a supplementary clamp, and then by a main clamp after the supplementary clamp has been moved out of engaging position, and out of a position of interference with the cutting operation.

In this connection I provide for safety devices by means of which the supplementary knife will be positively thrown out of the way before it can move into the path of the cutting blade, and I provide for a simple preferred structure, whereby the supplementary clamp arm is carried on the main clamp bar, and can be very easily swung into clamping position or tripped from clamping position, both manually and automatically.

I accomplish my objects by that certain construction and arrangement of parts to be hereinafter more specifically pointed out and claimed.

In the drawings:—

Figure 1 is a top plan view of the device.

Figure 1ª is a plan view of the latch mechanism in engagement with the releasing pin.

Figure 2 is a detail plan view showing the cutting knife and shearing edge with relation to the supplementary clamp.

Figure 3 is a detail plan of the latch for holding up the clamp.

Figure 4 is a detail section taken through the clamp, showing the latching thereof.

Figure 5 is a front elevation of the device.

Figure 6 is a detail side elevation of the supplementary clamp.

Figure 7 is a like view, taken from the opposite side to Figure 6.

Figure 8 is an end elevation of a slicing machine with my invention attached.

Figure 9 is a cross section of machine of Figure 8.

I have not shown a meat slicing machine in detail, but merely the posts 1, of a moving meat table on which the normal meat clamp bar is to be arranged and generally the operating mechanism for the table. The clamp bar 2, in the form selected for illustration, has a socket piece 3, hinged thereto, which rides over one of the posts, and a socket piece 4, which rides over the other. A fixed dog 5 on the one end of the bar engages the teeth of one of the posts, and a spring dog 6 on the other end of the bar, controlled by a trip lever 7, engages the teeth on the other post. By this means the bar, which has depending teeth 8, is raised and lowered and held in clamping position on the meat table.

The main bar, which may be of any type of mounting, is formed with bosses 9 thereon, which mount a rotatable or rock shaft 10. Wound about this shaft are the springs 11, which rest against the main clamp bar, and against the cross bar 11ª of the arms of the supplementary bar. The supplementary bar 12, has arms 13, which are fast on the rock shaft, so that by rocking down the supplementary bar, it will move into position against the meat in advance of the main bar. (Figs. 5 and 6.)

Mounted on a bracket 14 on the main meat clamp bar is a spring latch 15, having a wing 16 for manual operation. The latch engages a tooth 17, which is mounted by means of a small angle plate on the cross bar 11ª of the supplementary clamp.

Thus, when the rock shaft is permitted to operate under the impulse of the spring, the supplementary clamp will swing to a vertical position, and the latch will automatically engage and hold it there, well out of the way of the main clamp bar, and preferably behind the vertical plane intersecting the advancing edge of the main clamp, so as not to come into contact with the cutting knife.

In the machine illustrated, the knife as at 18, will be arranged to swing across the advance edge 19 of the table over which the meat is moved. It will be noted that the supplementary clamp must not extend over this cutting edge on the table, or else the knife will strike it. In machines of this type, the advance of the meat clamp supporting posts is usually automatically stopped before the meat clamp itself comes to this danger line.

In order to hold the supplementary clamp down, the rock shaft 10 is provided at one end with a ratchet faced disk 20, and a stop tooth 21. A socket piece 22, on the projected end of the main meat clamp bar carries a spring pressed dog 23, that engages in the ratchet teeth. The engaging tooth of the dog is sloped upwardly on the down side, so that the supplementary clamp can be swung down, and will stay in such position until the spring dog is pulled back.

To accomplish this pulling back of the spring dog, it is provided with a stud 24, which extends up through the slotted top of the socket piece 22. Pivoted on a screw stud 25 on the extension of the main bar, is a plate 26 through which the stud 24 extends. On a stud 27 on the plate 26 is a tripping lever 28 of bell crank shape, and the plate 26 has an ear 29 thereon, which the lever 28 will engage when it is swung to suitable position. On the plate 26 and on the tripping lever 28, are ears which support a spring 30 that holds them together.

As so constructed, a rearward pressure on the lever 28 will cause it to engage the ear 29, and the lever and plate will then swing rearwardly from the position shown in Figure 1 to the position shown in Figure 1ª.

This movement will retract the spring dog, and release the ratchet, whereupon the rock shaft will swing to a position of lifting the clamp bar to a position such as is shown in Figure 4.

This movement can be made to operate automatically by the use of a stud located in feed position on the meat slicing machine such as is indicated at 31 in Figures 1 and 1ª. As the clamp device moves forwardly, the stud will contact with the lever 28, before the supplementary clamp gets to a position of interfering with the cutting knife. The plate 26 will be swung rearwardly far enough to clear the spring dog, and the supplementary clamp will swing out of the way.

The stud will pass the end of the lever 28, due to the fact that the plate 26 will spring far enough out of the way to permit this, and on the return movement of the meat clamp for another operation, the lever 28 will swing over, extending the spring 30, without offering any interference to the retractile motion of the table. It is because of the requirement for this rearward motion that the part 28 is used, as otherwise the plate 26 and part 28 could be made of one piece.

My device will be very useful in cutting long pieces of meat, since the clamp bar will be set down well behind the front edge of the piece, and the supplementary clamp then released and swung down to clamping position, being held there by the ratchet and dog device. The operator need pay no more attention to the supplementary clamp, since it will swing out of the way when the main clamp has advanced far enough to hold the meat firmly along a line close enough to the cutting edge to prevent improper slicing.

In machines which operate by power in packing houses, for slicing bacon, my device has a particular application, since it saves a resetting of the machine, loss of imperfect slices following imperfect setting, and requirement for extra labor to accomplish the resetting of a large number of machines, such as the packers employ.

It will be understood that I have shown but one illustrative embodiment of my invention, the novelty in which invention will be set forth in the claims.

To show a machine to which my device is attached, I have selected in Figures 8 and 9, a machine which has been in the past manufactured by me. In this machine the casing of the machine is shown at 60, and the knife blade at 61, same being swung and revolved through the medium of an arm 62 and belt 63. Within the casing are a pair of parallel rods 64, on which slides a frame 65. This frame carries a nut 66, which is brought into contact with a screw 67, whereby said screw serves to feed the frame along.

The frame extends out through a space along each side of the top of the casing, as at 68, and upon the said projections 68, is mounted the meat plate 69, so that said meat plate feeds along with the frame beneath it. The two posts 1, 1, of the clamp of my invention are shown as mounted on the projections 69.

The stop for the operation of the auxiliary clamp arm trip, heretofore referred to as 31, is shown as mounted in the casing in a position to pass up through sufficient space to engage the trip throughout the normally expected adjustments of the main meat clamp.

Naturally in some other type of meat slicer, the trip pin would be mounted in a similar way, so as to engage the trip when the clamp had approached to within the given distance of the knife. In the Van Berkel type of machines the pin would have to be on the frame which travels to and fro, rather than on the meat plate which travels transverse of the travel of the frame.

Having thus described my invention what I claim as new and desire to secure by Letters Patent is:—

1. In a meat clamp, the combination with a main clamping element, of a supplementary clamping element arranged to engage the meat ahead of the main clamping element, and means for automatically raising the supplementary clamping element.

2. In a meat clamp, the combination with a main clamping element, of a supplementary clamping element mounted movably thereon, and arranged when moved to engage the meat ahead of the main clamping element.

3. In a meat clamp, the combination with a main clamping element, of a supplementary clamping element mounted movably thereon, and arranged when moved to engage the meat ahead of the main clamping element, and so mounted as to swing to a position substantially behind the vertical plane of the advancing edge of the main clamping element.

4. In a meat clamp, the combination with a main clamping element, of a supplementary clamping element mounted movably thereon, and arranged when moved to engage the meat ahead of the main clamping element, and means for automatically moving said supplementary clamping element to a position out of engagement with the meat.

5. In a meat clamp, the combination with a main clamping element, of a supplementary clamping element mounted movably thereon, and arranged when moved to engage the meat ahead of the main clamping element, and means for automatically moving said supplementary clamping element to a position out of engagement with the meat, and behind the vertical plane of the advancing edge of the main clamping element.

6. In a meat clamp, a clamp bar arranged to be lowered into clamping engagement with a piece of meat, arms pivoted on the main clamp bar and carrying a supplementary meat clamp, means for holding said supplementary meat clamp in engagement with the meat, and means for releasing said supplementary meat clamp.

7. In a meat clamp, a clamp bar arranged to be lowered into clamping engagement with a piece of meat, arms pivoted on the main clamp bar and carrying a supplementary meat clamp, means for holding said supplementary meat clamp in engagement with the meat, and means for releasing said supplementary meat clamp automatically to move to a position behind the advancing edge of the clamp bar.

8. In a meat clamp, a clamp bar, a rock shaft carried thereby, a supplementary meat clamp arranged on said shaft so as to engage the meat ahead of the main clamp, a ratchet device to hold the rock shaft in position of retaining the supplementary clamp in engagement with the meat, and spring means for moving the rock shaft to position of elevating the supplementary clamp.

9. In a meat clamp, a clamp bar, a rock shaft carried thereby, a supplementary meat clamp arranged on said shaft so as to engage the meat ahead of the main clamp, a ratchet device to hold the rock shaft in position of retaining the supplementary clamp in engagement with the meat, and spring means for moving the rock shaft to position of elevating the supplementary clamp, and automatic means for releasing said ratchet.

10. In a meat clamp, a clamp bar, a rock shaft carried thereby, a supplementary meat clamp arranged on said shaft so as to engage the meat ahead of the main clamp, a ratchet device to hold the rock shaft in position of retaining the supplementary clamp in engagement with the meat, and spring means for moving the rock shaft to position of elevating the supplementary clamp, and automatic means for releasing said ratchet, and for latching the supplementary clamp in elevated position.

ELMER G. STRECKFUSS.